US009030477B2

(12) United States Patent
Schnitzer et al.

(10) Patent No.: US 9,030,477 B2
(45) Date of Patent: May 12, 2015

(54) EDITABLE CHARACTER ACTION USER INTERFACES

(75) Inventors: Adam Schnitzer, Petaluma, CA (US); Joshua Goldenberg, Emeryville, CA (US); Kent Oberheu, Berkeley, CA (US); Domenico Porcino, San Rafael, CA (US); Louise Rasmussen, Fairfax, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 469 days.

(21) Appl. No.: 13/168,189

(22) Filed: Jun. 24, 2011

(65) Prior Publication Data
US 2012/0327088 A1 Dec. 27, 2012

(51) Int. Cl.
*G06T 13/00* (2011.01)
*G11B 27/34* (2006.01)
*G11B 27/034* (2006.01)

(52) U.S. Cl.
CPC .............. *G11B 27/34* (2013.01); *G11B 27/034* (2013.01); *G06T 13/00* (2013.01)

(58) Field of Classification Search
None
See application file for complete search history.

(56) References Cited

U.S. PATENT DOCUMENTS

| 6,091,427 | A | * | 7/2000 | Boezeman et al. | 345/474 |
| 6,144,385 | A | * | 11/2000 | Girard | 345/424 |
| 6,714,201 | B1 | * | 3/2004 | Grinstein et al. | 345/474 |
| 6,972,765 | B1 | * | 12/2005 | Duplat | 345/473 |
| 7,324,121 | B2 | * | 1/2008 | Young | 345/689 |
| 8,606,678 | B2 | * | 12/2013 | Jackowitz et al. | 705/36 R |
| 8,701,008 | B2 | * | 4/2014 | Keng et al. | 715/723 |
| 2004/0027352 | A1 | * | 2/2004 | Minakuchi | 345/473 |
| 2004/0100482 | A1 | * | 5/2004 | Cajolet et al. | 345/716 |
| 2005/0156932 | A1 | | 7/2005 | Vienneau et al. | |
| 2007/0262996 | A1 | | 11/2007 | Fernandez et al. | |
| 2009/0046097 | A1 | | 2/2009 | Franklin | |
| 2010/0085351 | A1 | * | 4/2010 | Deb et al. | 345/419 |
| 2010/0156911 | A1 | * | 6/2010 | Zhao et al. | 345/474 |
| 2010/0207950 | A1 | * | 8/2010 | Zhao et al. | 345/473 |
| 2010/0214313 | A1 | * | 8/2010 | Herman et al. | 345/593 |
| 2014/0250392 | A1 | * | 9/2014 | Riggins et al. | 715/764 |

OTHER PUBLICATIONS

Bruma, Authorized Officer in corresponding PCT Application No. PCT/US2012/043722 "International Search Report and Written Opinion" dated Oct. 23, 2012, 9 pages.
International Preliminary Report on Patentability and Written Opinion of the International Searching Authority for corresponding International Application No. PCT/US2012/04372722 mailed on Dec. 24, 2013, 5 pages.

* cited by examiner

*Primary Examiner* — Ulka Chauhan
*Assistant Examiner* — Andrew G Yang
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes defining at least one of a location in a virtual scene and a time represented in a timeline as being associated with a performance of an animated character. The method also includes aggregating data that represents actions of the animation character for at least one of the defined location and the defined time. The method also includes presenting a user interface that includes a representation of the aggregated actions. The representation is editable to adjust at least one action included in the aggregation.

27 Claims, 10 Drawing Sheets

EDITABLE CHARACTER ACTION USER INTERFACES

TECHNICAL FIELD

This document relates to systems and techniques for directing the performance of one or characters in a motion picture (e.g., an animated film), video game title, etc. by providing editable user interfaces that summarize character actions for particular instants during the performance or scene locations.

BACKGROUND

Producing and editing motion pictures that include animated characters can often result in vast amounts of information associated with each movement of a character's performance. For example, for each scene, data may be used to represent the character's position, movement, etc. (including appendages, facial expressions, etc.) along with similar information for other animated objects (e.g., a projectile thrown by the character). Providing such detailed information (e.g., representing the angular position of the character's left elbow for a particular time instant) may distract production personnel (e.g., editors, directors, etc.) and cause difficulties in following the overall performance of the character and may even result in losing track of the performance.

SUMMARY

The described systems and techniques are for producing user interfaces that include editable content that summarizes the actions of an animated character at particular time instants of a performance or at particular locations within a virtual scene. Along with temporally and spatially relocating the user interfaces to alter the character performance, individual actions represented in the user interfaces may be transferred for being executed at a different performance time and/or scene location.

In one aspect, a computer-implemented method includes defining at least one of a location in a virtual scene and a time represented in a timeline as being associated with a performance of an animated character. The method also includes aggregating data that represents actions of the animation character for at least one of the defined location and the defined time. The method also includes presenting a user interface that includes a representation of the aggregated actions. The representation is editable to adjust at least one action included in the aggregation.

Implementations may include any or all of the following features. The aggregated actions may represent actions for multiple times during the performance. The aggregated actions may represent actions for multiple locations in the virtual scene. The defined location may be graphically represented in the virtual scene. The graphical representation in the virtual scene may represent multiple defined locations based upon a viewing scale of the virtual scene. The defined time may be graphically represented on the timeline. The graphical representation on the timeline may represent multiple defined times based upon the viewing scale of the timeline. The presented user interface may be relocatable to at least one of another location in the virtual scene and another time represented in the timeline. One or more of the actions included in the aggregated actions represented in the user interface may be relocatable to at least one of another location in the virtual scene and another time represented in the timeline. The user interface may be relocated to a viewable location in the virtual scene if the defined location is outside the presented virtual scene. The user interface may be relocated to a viewable portion of the timeline if the defined time is outside the presented timeline.

In another aspect, a system includes a computing device that includes a memory configured to store instructions. The computing device also includes a processor configured to execute the instructions to perform a method that includes defining at least one of a location in a virtual scene and a time represented in a timeline as being associated with a performance of an animated character. The method also includes aggregating data that represents actions of the animation character for at least one of the defined location and the defined time. The method also includes presenting a user interface that includes a representation of the aggregated actions. The representation is editable to adjust at least one action included in the aggregation.

Implementations may include any or all of the following features. The aggregated actions may represent actions for multiple times during the performance. The aggregated actions may represent actions for multiple locations in the virtual scene. The defined location may be graphically represented in the virtual scene. The graphical representation in the virtual scene may represent multiple defined locations based upon a viewing scale of the virtual scene. The defined time may be graphically represented on the timeline. The graphical representation on the timeline may represent multiple defined times based upon the viewing scale of the timeline. The presented user interface may be relocatable to at least one of another location in the virtual scene and another time represented in the timeline. One or more of the actions included in the aggregated actions represented in the user interface may be relocatable to at least one of another location in the virtual scene and another time represented in the timeline. The user interface may be relocated to a viewable location in the virtual scene if the defined location is outside the presented virtual scene. The user interface may be relocated to a viewable portion of the timeline if the defined time is outside the presented timeline.

In another aspect, a computer program product tangibly embodied in an information carrier and comprising instructions that when executed by a processor perform a method that includes defining at least one of a location in a virtual scene and a time represented in a timeline as being associated with a performance of an animated character. The method also includes aggregating data that represents actions of the animation character for at least one of the defined location and the defined time. The method also includes presenting a user interface that includes a representation of the aggregated actions, wherein the representation is editable to adjust at least one action included in the aggregation.

Implementations may include any or all of the following features. The aggregated actions may represent actions for multiple times during the performance. The aggregated actions may represent actions for multiple locations in the virtual scene. The defined location may be graphically represented in the virtual scene. The graphical representation in the virtual scene may represent multiple defined locations based upon a viewing scale of the virtual scene. The defined time may be graphically represented on the timeline. The graphical representation on the timeline may represent multiple defined times based upon the viewing scale of the timeline. The presented user interface may be relocatable to at least one of another location in the virtual scene and another time represented in the timeline. One or more of the actions included in the aggregated actions represented in the user interface may be relocatable to at least one of another location in the virtual scene and another time represented in the timeline. The user interface may be relocated to a viewable location in the virtual scene if the defined location is outside the presented virtual scene. The user interface may be relocated to a viewable portion of the timeline if the defined time is outside the presented timeline.

Details of one or more implementations are set forth in the accompanying drawings and the description below. Other features, aspects and advantages will be apparent from the description and drawings, and from the claims.

DETAILED DESCRIPTION

Figure 1:
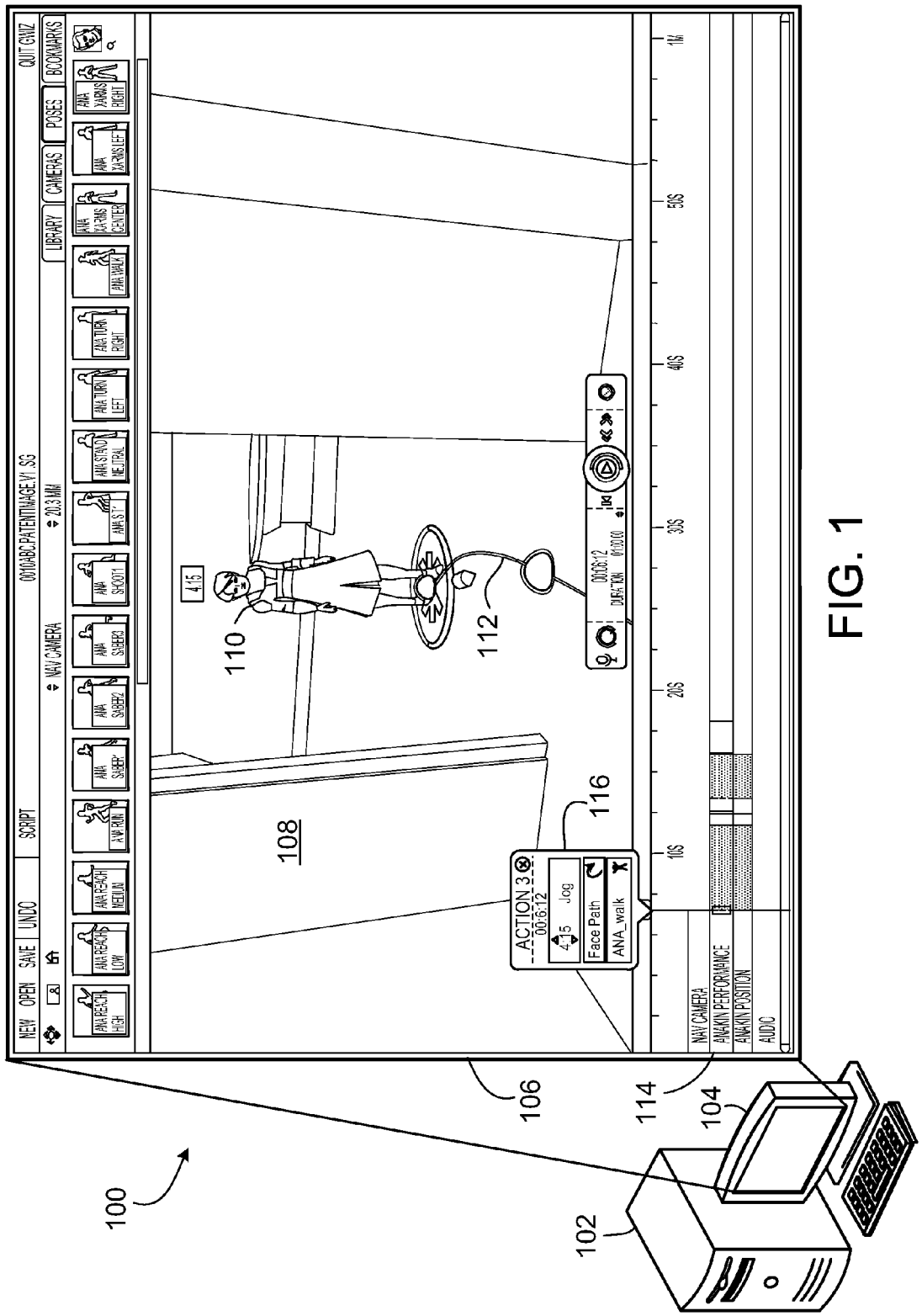
FIGS. 1 and 3 illustrate character action interfaces being presented on a timeline.

FIG. 1 illustrates an exemplary animation system 100 for producing and editing offline production projects (e.g., motion pictures, television programs etc.) as well as portions of online projects (e.g., segments for interactive virtual environments such as video game titles, etc.). While the system 100 may be used for producing projects that include animated characters, the production and editing functionality may also be used for projects that include real-life actors or a combination of animated and real-life actors. To assist reviewing and editing character actions at particular times during a performance or at particular scene locations, the system 100 produces user interfaces that present an editable summary of the actions of the character. In general, presentation of the user interfaces is controlled by a user interacting with the system 100 (e.g., selected for presentation by an editor, director, etc.). As such, only character actions of interest to a user are presented and the graphical display does not become cluttered with character information that could distract the user.

In this particular example, the system 100 includes a computing device (e.g., a computer system 102) that is used for reviewing and editing the performance of an animated character. To view the material, a display 104 (connected to the computer system 102) presents a graphical user interface (GUI) 106 that represents a portion of a production (e.g., an animated motion picture). The GUI 106 can include various types of information such as a representation of a three-dimensional virtual scene 108 within which an animated character 110 is located. Additional information is represented in the GUI 106, for example, a graphical line 112 identifies the direction that the character 110 is to move within the scene. The GUI 106 also includes a collections of timelines associated with the scene and the performance of the animated character 110. For example, one timeline 114 is associated with the performance of the character over a period of time. During this performance period, it may be desirable that the character execute a number of actions at particular time instants. For example, the character may be running forward, speaking a line of dialogue, and changing his facial expression at a particular instant (referred to as a mark). Over the course of a scene, a considerable number of marks may be defined that are each associated with actions to be executed by the character. As such, a significant amount of information related character actions may be associated with marks in a scene which could easily become unwieldy to review even for a relatively short scene. To allow easy review of the actions for each mark in a scene, a user interface 116 is produced that includes of an aggregate of the actions being executed by the character at that particular mark. For example, the user interface may list the actions of the character (e.g., running, changing facial expression, speaking dialogue, etc.) for a particular mark. By presenting a concise listing of the actions, a user (e.g., an editor, director, etc.) can quickly determine which executed actions are associated with the mark and if the actions are appropriate with respect to the overall performance of the character.

One or more techniques and methodologies may be implemented to represent information associated with the performance of a character (e.g., actions). For example, the user interface may include an aggregate listing of the actions being executed by the character at the mark. Along with identifying each action, appropriate parameters associated with one or more of the actions (e.g., run speed, turning angle, etc.) may also be listed in the user interface. In this particular example, the user interface 116 includes three actions (to be executed by the character at the mark) that associate with character movement (e.g., walking), the direction that character is facing while moving, and the type of movement (e.g., a jog). Additionally, a numerical value (e.g., 4.15) represents the speed at which the character is moving at the mark in the scene. While three actions are presented in the user interface 116, more or less actions may be included. Additionally, a user interface may include actions for multiple characters. For example, upon multiple characters being selected by a user, a user interface may be presented that includes actions of each character. Similarly, selecting a particular scene location or performance time, a user interface may be presented that includes the actions each character associated with that particular location or time.

In addition to presenting the actions associated with a particular mark (represented on a timeline), the presented actions may be editable. For example, actions may be removed from the user interface 116 such that the actions are not executed by the character at the associated mark. Similarly one or more actions may be added to the user interface 116 such that the newly added actions are executed by the character at the corresponding time on the timeline 114 associated with the mark. Actions may also be transferable (e.g., copied, moved, etc.). In this illustration, the user interface 116 is associated with a mark defined by a particular time during the character's performance, however, interfaces may be associated with marks defined by other information associated with a performance, such as locations within a scene.

Figure 2:
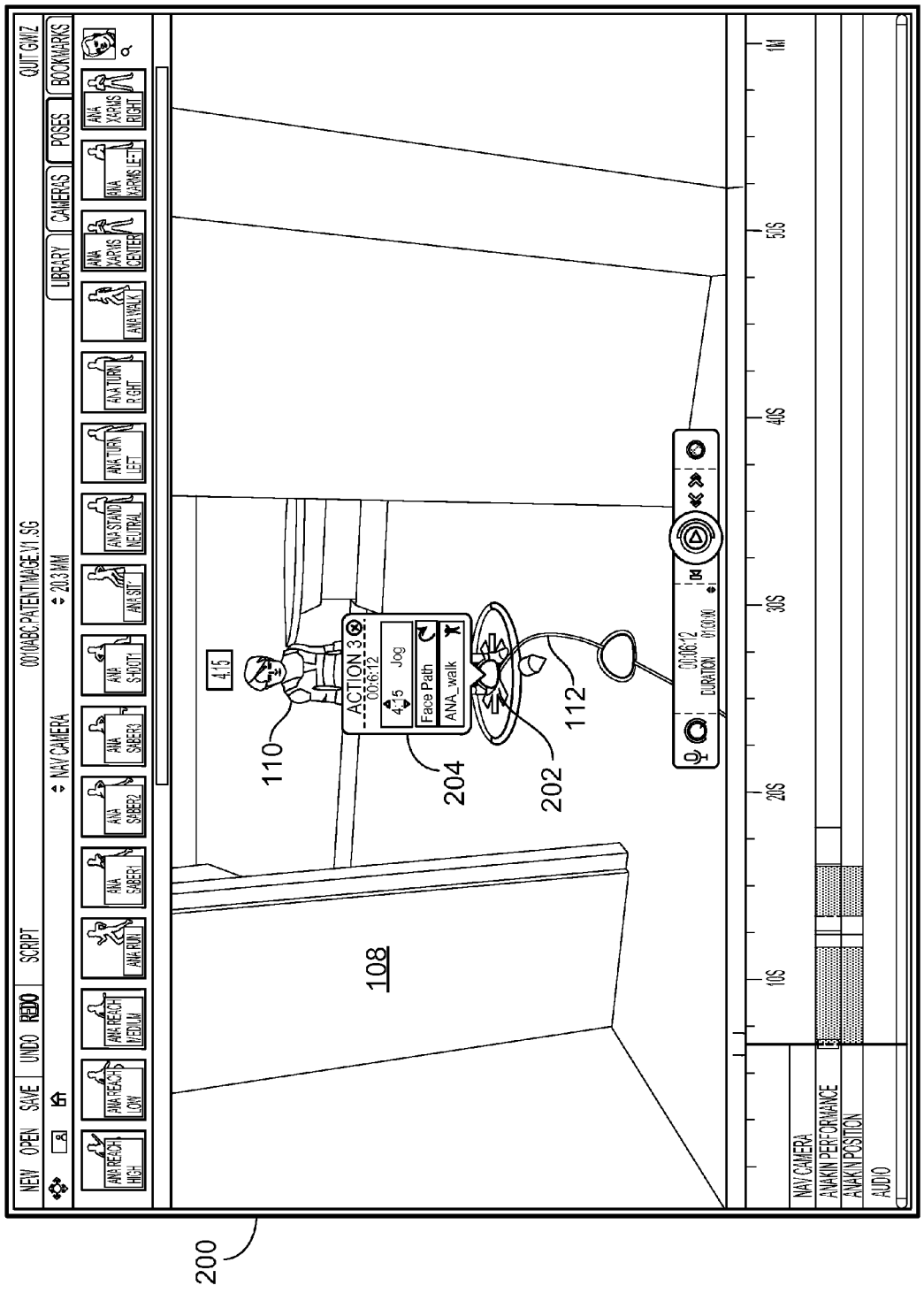
FIGS. 2 and 4 illustrate character action interfaces being presented in a virtual scene.

Referring to FIG. 2, a GUI 200 is presented that is substantially equivalent to the GUI 106 shown in FIG. 1, however, a user interface that provides a summary of the character related actions is presented within the three-dimensional virtual scene rather than being attached to a timeline (as presented in FIG. 1). In this particular illustration, the user (e.g., the editor, director, etc.) selects a mark 202 (in the virtual scene 108) that is associated with the performance of the character 110. Upon selection, a user interface 204 is presented that contains a listing of the actions associated with the character 110 at that mark 202. In this example, the user interface 204 contains action information that is identical to the information provided in the user interface 116 (shown in FIG. 1), however, in some arrangements the information presented in a virtual scene may not be equivalent to information provided by a user interface attached to a timeline. Provided such versatility for reviewing information, an editor or director can be quickly presented action information regardless of whether they are focusing on a temporal aspect (e.g., a timeline) or a spatial aspect (e.g., a particular location) of a scene.

Figure 3:
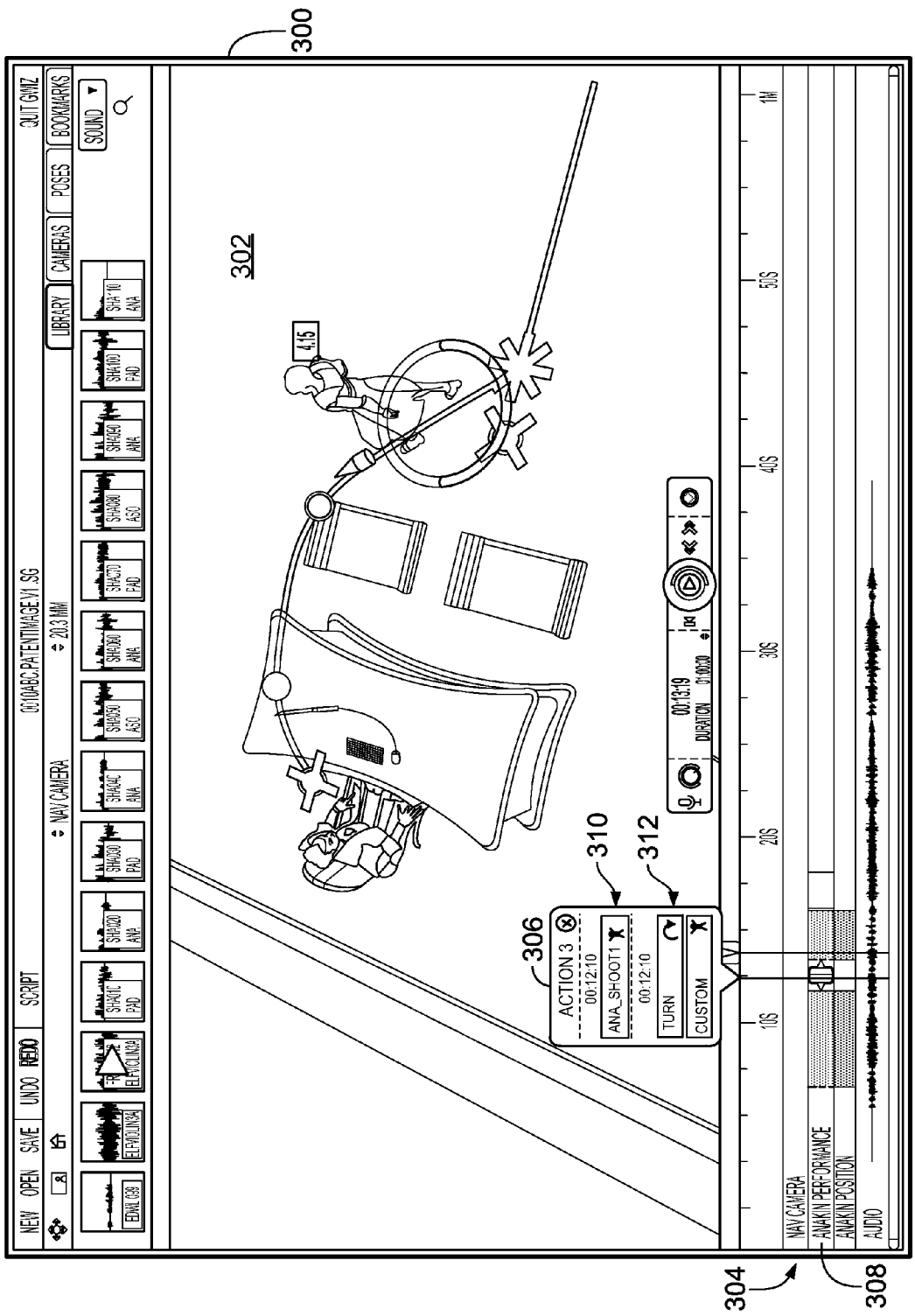
Figure 4:
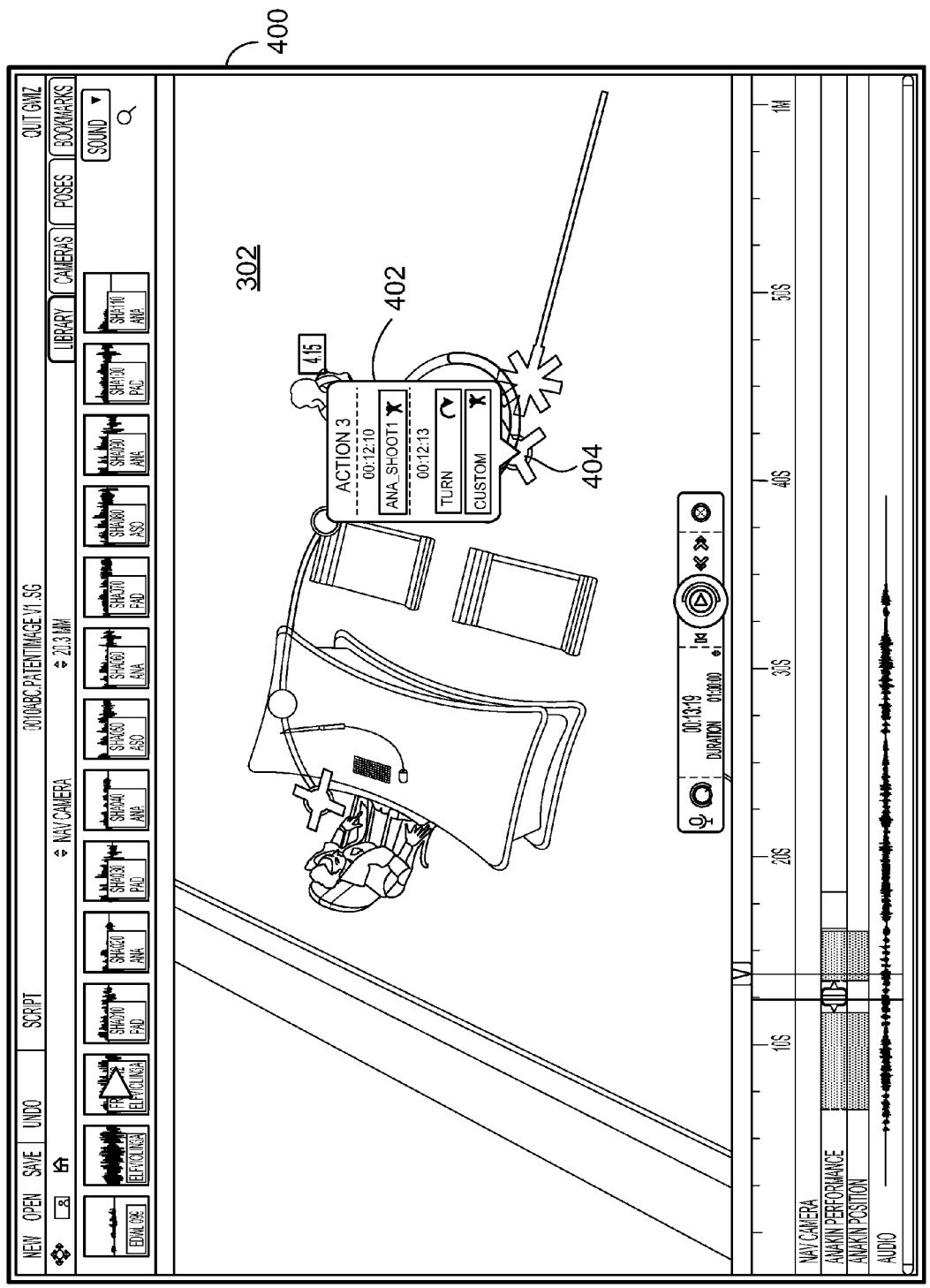

Referring to FIGS. 3 and 4, another GUI 300 is presented that includes a different three-dimensional virtual scene 302 and timelines 304 associated with actions occurring in the scene. In FIG. 3, upon selecting a mark on a timeline associated with character action, a user interface 306 is presented that lists each action of the character for the selected time during the performance. In this particular example, the user interface 306 is illustrated as being attached to a mark on a timeline 308 related to the performance of one character. In this example, the user interface 306 includes lists of actions for two time instants (e.g., actions associated with time mark 00:12:10 and actions associated with time mark 00:12:13). The time difference between the actions is only fractions of a second and the scale of the timeline 308 does not completely resolve the two separate time marks. As such, the user interface 306 includes a list of actions 310 associated with the first instant (e.g., time mark 00:12:10) and a list of the action 312 associated with the second instant (e.g., time mark 00:12:13). By reviewing the contents of the user interface 306, a user can study each of these rapidly occurring actions along with changing the actions (e.g., re-ordering the actions, adding actions, removing actions, etc.) or parameters associated with the actions (e.g., change the direction the character turns, etc.). FIG. 4, illustrates a GUI 400 that is substantially equivalent to the GUI 300 presented in FIG. 3, however, a user interface 402 of character actions is presented in the space of the virtual scene 302 rather than being associated with a timeline. As illustrated in FIGS. 3 and 4, for each mark defined in the space of the virtual scene, a corresponding mark is defined along one or more timelines. As such, a user can quickly review and change corresponding actions while focusing on temporal information (represented in the timelines) or spatial information (represented in the virtual scenes). In this example, the user interface 402 contains the same character action information as the user interface 306 (shown in FIG. 3). In particular, actions associated with two different times (e.g., time marks 00:12:10 and 00:12:13) are presented being executed by the character at mark location 404 within the virtual scene. While each of the user interfaces 306 and 400 presented a relatively small number of actions associated with a character, many types of actions and other types of information may be represented in a user interface associated with a temporal or spatial mark.

Figure 5:
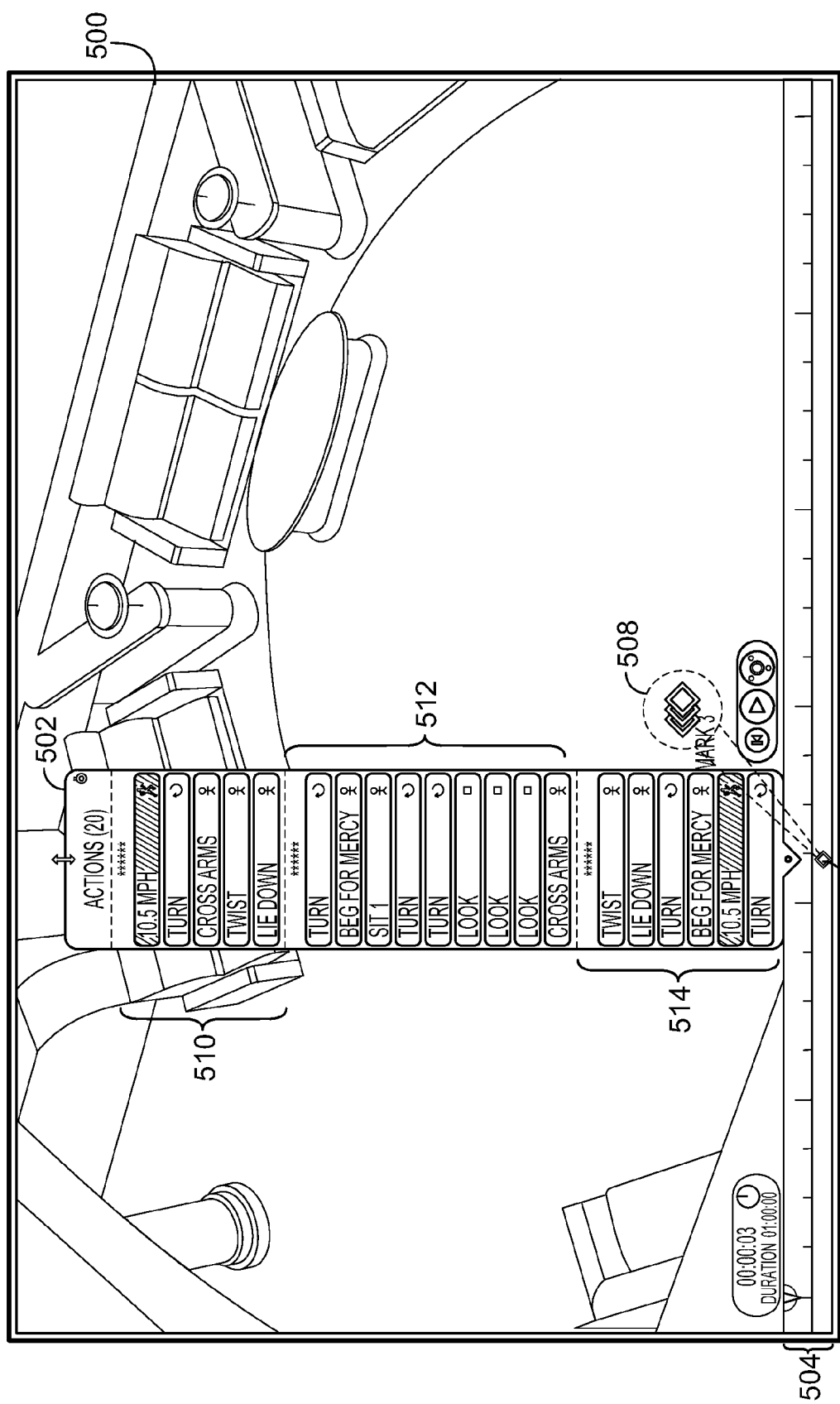
FIG. 5 illustrates exemplary content of a character action interface.

Referring to FIG. 5, similar to previous figures, a GUI 500 includes a user interface 502 that may be associated with a particular time in a character performance or a location within a scene. In this particular example, the user interface 502 is associated with a timeline 504 that is used to define the performance of a character. In this arrangement, the user interface 502 represents character actions associated with three time marks. Due to the scale of the timeline, a single time mark 506 represents the three marks compressed in time (as illustrated in an expanded view 508 of the single time mark). In this arrangement of the user interface 502, actions associated with the earliest of the three time marks (e.g., time 00:00:22) are represented from the top of the user interface (highlighted by bracket 510) while actions executed at the intermediate time mark (e.g., time 00:00:30) are presented in the middle of the user interface (highlighted by bracket 512) and actions of the later time mark (e.g., time 00:00:35) are presented at the bottom of the user interface (highlighted by bracket 514). Different ordering schemes and presentation styles may also be implemented.

As provided by the user interface 502, various types of actions and related information may be represented for one more marks related to particular performance times or scene locations. For example, actions associated with different poses (e.g., arm and leg movements, head turns, sitting, standing, lie down, etc.) and actions definable by one or more parameters (e.g., running speed, jump height, etc.) may be included. Actions defined by a group of several separate actions may be included, for example, an action titled "beg for mercy" may include the actions of kneeling, bowing the head and cupping ones hands. Actions may also include dialogue, for example, one of more lines from a script may be defined as an action in which a character speaks the lines at a particular mark (or at a particular location). Actions may also include changing facial expressions of a character (e.g., from a neutral expression to an expression of joy) and may include expressions that are particularly useful in recognizing the character (e.g., a signature expression such as eye squint that is well known and makes the character easily recognizable). In some arrangements, such actions may be defined by separate applications and cataloged for retrieval, for example, by using an interface such as the GUI 500.

In this particular illustration a single time mark 506 appears on the timeline 504 and represents multiple marks (due to the presented scale of the timeline). Similarly, a mark represented within a three-dimensional virtual scene may also represent multiple marks. For example, three closely located marks may each be associated with different actions that are respectively executed by a character at these locations. Based upon the scaling of the virtual scene, the three locations may appear to be a single location (and the three marks are represented by a single mark). For such a situation, upon being selected by a user for presentation, the user interface for the single location may include the actions for each of the three closely located marks.

Figure 6:
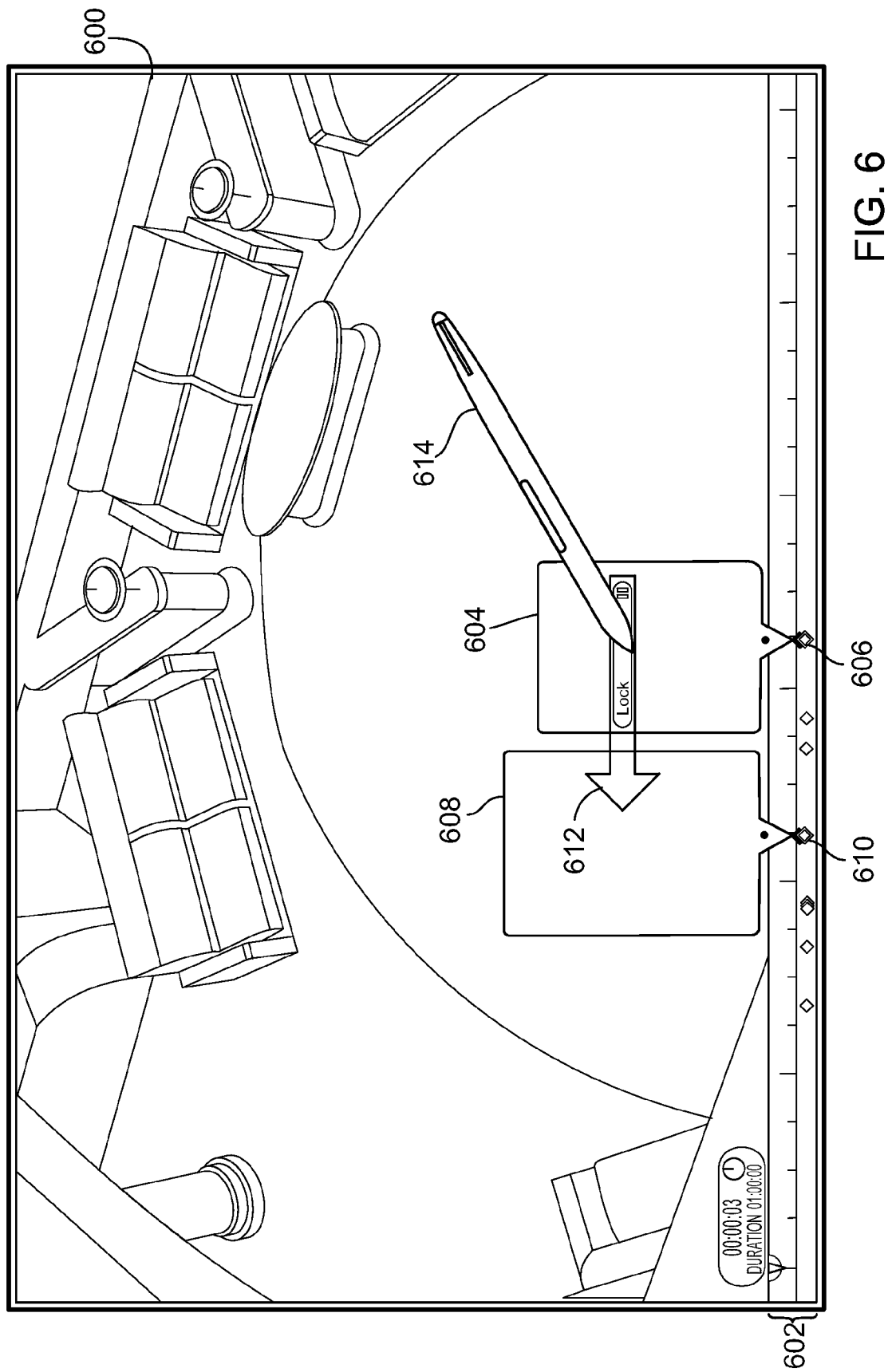
FIG. 6 illustrates transferring an action between two action interfaces.

Referring to FIG. 6, along with providing a listing of actions associated with a mark (for a particular time along a timeline or location in a virtual scene), a user interface, its contents and related information may be relocated (e.g., to another time along the timeline, to another location within the scene, etc.). For example, moving a mark to another position on a timeline or to another location within a virtual scene, associated actions are moved (along with the corresponding user interface) and thereby changing the performance of the character. Similarly, one or more actions represented with one mark (e.g., a temporal mark or a spatial mark) may be transferred to one or more other marks. For example, an action can be moved (e.g., remove an action from one user interface and moved to another user interface), copied (e.g., duplicate and action in one user interface and move it to another user interface) or other similar types of transferring or combination of transfers. In the example illustrated in the figure, a GUI 600 includes a timeline 602 upon which a number of marks are represented at different times. To illustrate the transfer, a user interface 604 is shown as being associated with one temporal mark 606 while another user interface 608 is presented as being associated with another temporal mark 610 (which occurs at an earlier time, compared to the first mark 606). A process arrow 612 represents the transferring of an action (e.g., to have the character look) from the user interface 604 to the user interface 608. In this particular implementation, a stylus 614 is operated by a user to direct transfer operations, however, one or more other techniques and methodologies may be used for controlling such operations. For example other types of pointing devices (e.g., a mouse) or touch screen techniques (e.g., allowing the touch of a user's finger to control operations). In this particular example, an action is transferred from a user interface associated with a mark on a timeline to another user interface associated with another mark on the same timeline. However, transfers between user interfaces associated with marks located in a virtual scene may also be executed. Further, actions may be transferred between an interface associated with a mark on a timeline and a user interface associated with a mark located within a virtual scene. In one example, an action may be transferred (e.g., dragged and dropped by using a pointing device) to a location near a path defined as being traversed by the character. Being proximate to the predefined path (e.g., as defined by a threshold), a mark may be created on the path to represent the newly transferred action. Also, along with relocating marks (and corresponding user interfaces) among different locations in a virtual scene, marks may be relocated along a timeline or between locations on a timeline and locations in a virtual scene.

Figure 7:
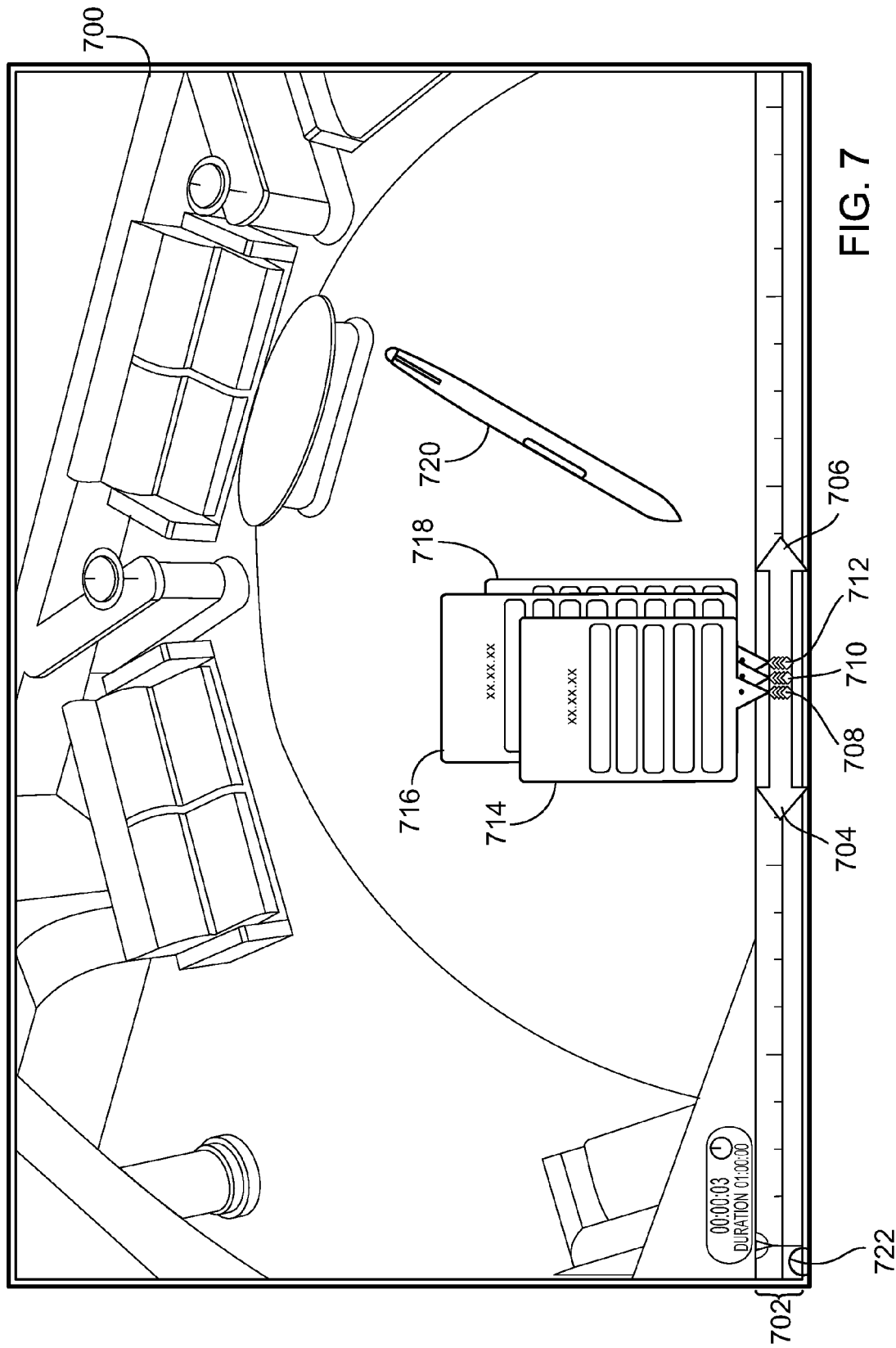
FIG. 7 illustrates presenting interfaces tightly grouped along a timeline.

Referring FIG. 7, a GUI 700 illustrates that portions of the GUI may be expanded, compressed, etc. for presenting user interfaces, for example, associated with timelines, virtual scenes, etc. In this particular example, the scale of a time line 702 is expanded (as represented with outward reaching arrows 704, 706) thereby increasing the visible resolution of the timeline. Based upon the stretching of the timeline 702, three marks 708, 710, 712 may be viewed at three separate and distinct positions along the timeline. As such, a user may select one or more of the marks for viewing a corresponding user interface, for example, to review actions to be executed by a character at the associated time on the timeline 702. In this illustration, each of the marks 708, 710, 712 have been selected and corresponding user interfaces 714, 716, 718 are presented in an overlapping fashion. Various techniques may be used for determining the order to overlap the interfaces, for example, priority may be determined based upon the time associated with each mark. For example, user interfaces associated with earlier occurring marks may be presented in front of user interfaces associated with later occurring marks. Using this scheme, user interface 714 is presented in the front-most position, followed by user interface 716 and user interface 718. Other ordering schemes may also be implemented, for example, user interfaces associated with marks that occur later in time may be prioritized to appear in the forward-most position.

Similar to expanding the timeline 702, the timeline may also be compressed, for example, such that a larger portion of time associated with the character's performance is presented. Based upon the compression, a determination may be made that closely positioned marks (e.g., marks 708, 710 and 712) are to be represented as a single mark and the contents of the user interfaces associated with each mark be aggregated into a single user interface. For example, a predefined threshold may be used to determine if marks are proximate enough to be represented by a single mark and to aggregate their corresponding information into a single user interface.

Along with compressing and expanding a timeline to present different information to a user (e.g., an editor, director, etc.), other types of operations may be executed upon the timeline 702 (e.g., as controlled by a pointing device such as a stylus 720). For example, the timeline may be shifted to earlier times (e.g., shifted to the left) or later times (e.g., shifted to the right). Such shifting of the timeline 702 may cause one or more marks to be shifted to the point that they are no longer viewable on the GUI 700. For example, shifting to the left (in the direction provided by arrow 704), mark 708 could be the first of the three marks (e.g., marks 708, 710 and 712) to encounter the viewable boundary 722 of the GUI 700. Continuing to shift to the left, marks 710 and 712 could soon follow and also encounter the viewable boundary 722. Shifted pass the boundary 722, the marks 708, 710, 712 along with the associated user interfaces 714, 716, 718 would not be viewable by a user. One or more techniques may be implemented alert a user that one or more marks are located on the timeline but are not currently viewable in the GUI (e.g., due to shifting of the time line). For example, a graphical representation may be presented by the GUI 700 for each mark that is currently outside the view. In one implementation, the graphical representation may appear as a graphic that is similar to the graphic used when the mark is within the provided view of the GUI 700. For example, a shape similar to the diamond shape used represent the mark 708 may be used to represent the mark as being outside of the viewing field provided by the GUI 700. Such graphical representations may be positioned at various locations in the GUI 700. For example, the graphical representation may be positioned near the boundary of the GUI 700 from which the mark was shifted out of view. Continuing with the example of shifting mark 708 to the left until no longer viewable, a graphical representation may be placed upon the timeline 702 near the boundary 722 to notify the user to which side of the GUI 700 that the mark was shifted. Provided this information, the user could recognize that by shifting in the timeline 702 in opposite direction (e.g., to the right), the mark could be returned into view. Along with positioning graphical representations of the marks at the boundaries (or other locations), other information may also be located at these extreme positions of the timeline 702. For example, upon selecting the graphical representations at the boundaries, the user interfaces associated with the marks may be presented. As such, upon selecting the graphical representations associated with mark 708 (after being shifted to the left and out of view), the user interface 714 may be presented. Thus, while the position of a mark may be outside of a user's view, the information (e.g., character actions) included the corresponding user interface may still be attained.

Similar to positioning graphical representations at the boundary of a timeline to indicate that one or more marks have been shifted to a location out of view, graphical techniques may be used in the other portions of the GUI 700. For example, graphical representations may be used to illustrate the one or more marks are outside the presented view of the virtual scene. In one arrangement, graphical representations may be positioned at appropriate boundary locations of the virtual scene. As such, a user would be able to relatively quickly determine in what direction to pan the virtual scene or expand the view of the scene to identify an out-of-view mark. Further, the graphical representation located at the boundary of the virtual scene may be selected for presenting the user interface associated with the mark (and the corresponding character actions). For example, a user may zoom into a virtual scene to closely review the facial expression of a character and cause relatively closely located marks to be moved outside the viewing field. However, by placing a graphical representation (e.g., an intermittently flashing diamond graphic) at a boundary of the virtual scene (e.g., now predominately just presenting the character's face), the user can determine the direction to adjust to view to find the mark. Furthermore, the user can select the graphical representation to present the corresponding user interface to review a list of associated character actions. As such, the user is able to review details associated with a character or other objects while still being able to review character actions without needing to break his or her concentration by moving to another GUI or other interface.

Figure 8:
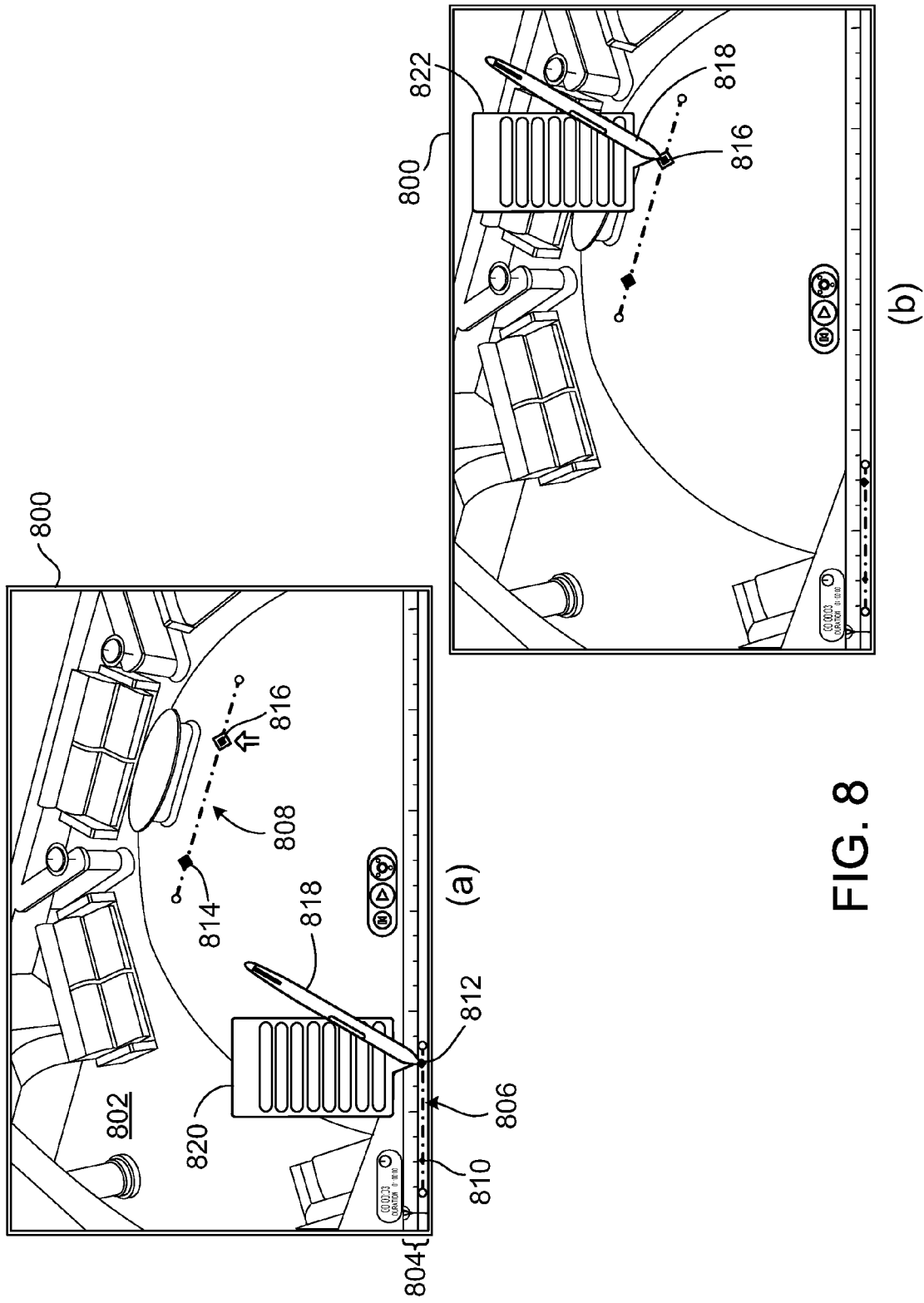
FIGS. 8(a) and (b) illustrate related action interfaces on a timeline and located in a virtual scene.

Referring to FIGS. 8(a) and (b) two images are presented of a GUI 800 to illustrate dynamic updating of related user interfaces. In general, each mark positioned along a timeline can be considered as having a counterpart mark located in a virtual scene, and vice versa. For example, character actions occurring at a particular time (along a timeline) also correspond to a location in the virtual scene where the actions are executed. As such, the actions listed in a user interface associated with the mark on the timeline should map to actions listed in a user interface associated with a counterpart mark located in the virtual scene. Further, upon one or more actions being changed (e.g., removed, new action added, parameter adjusted, etc.) in one of the user interfaces (e.g. the interface associated with the mark on the timeline), equivalent action changes are reflected in the other user interface (e.g., the interface associated with the mark in the virtual scene). As such, changes made in one user interface can be dynamically updated in one or more related user interfaces.

As illustrated in FIG. 8(a), the GUI 800 includes a three-dimensional virtual scene 802 and a timeline 804. A highlighted line 806 on the timeline 804 tracks a portion of a character's performance over this period of time. The virtual scene 802 includes a highlighted line 808 that corresponds to the location of the character when delivering this portion of the performance. Further, marks located in this highlighted portion of the timeline 804 (e.g., marks 810 and 812) have related marks located on the highlighted line 808 in the virtual scene 802 (e.g., marks 814 and 816). To demonstrate the relationship between the marks represented in the temporal domain and marks in the spatial domain, actions listed in corresponding user interfaces are illustrated. For example, as illustrated in FIG. 8(a), a stylus 818 is operated by a user to select one mark (e.g., mark 812) on the timeline 804. Upon being selected, a user interface 820 is presented that lists the one or more actions executed by the character at that time. Along with presenting the actions, the user interface 820 can be used to adjust the individual actions (e.g., change action parameters, etc.) and perform other action related operations such as adding actions, removing actions, copy actions, etc. Upon changing the actions listed in the user interface 820, other user interfaces associated related marks can be dynamically updated. For example, as illustrated in FIG. 8(b), a corresponding user interface 822 associated with the mark 816 can be dynamically updated upon adjustments and changes being completed in the user interface 820. As such, after changes are made in a user interface associated with a temporal mark (e.g., mark 812), a user interface associated with a corresponding spatial mark (e.g., mark 816) is updated. For example, using the stylus 818 to select the mark 816 (as shown in FIG. 8(b)), the user interface 822 is presented with updated content. Similarly, changing the content of a user interface associated with a spatial mark may trigger the updating of content included in a user interface associated with a corresponding temporal mark.

Figure 9:
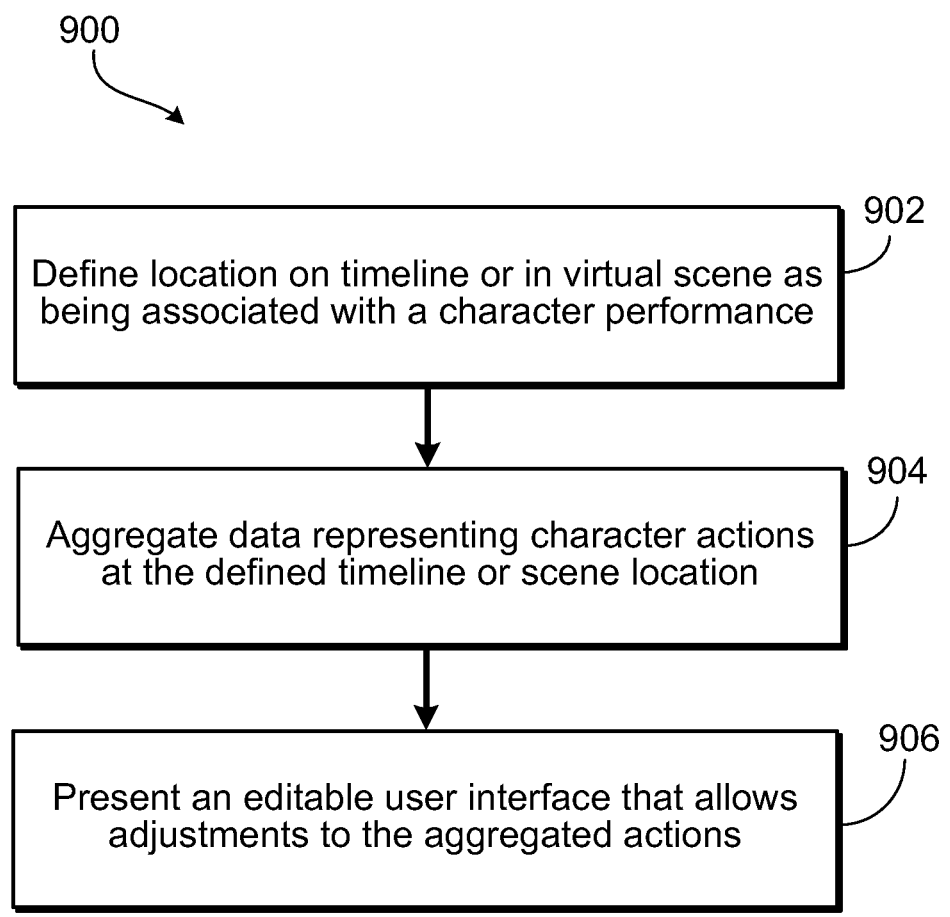
FIG. 9 is an exemplary flowchart of operations for presenting a character action interface.

Referring to FIG. 9, a flowchart 900 represents operations of a computing device such as the computer system 102 (shown in FIG. 1) to produce a user interface that includes a listing character actions being executed at a related performance time or scene location. Such operations are typically executed by components (e.g., one or more processors) included in a computing device, however, operations may be executed by multiple computing devices. Along with being executed at a single site (e.g., at the location of the video game console), operations execution may be distributed among two or more locations.

Operations of the computing device may include defining 902 a location on a timeline or a location in a virtual scene as being associated with the performance of a character. For example, a user (e.g., an editor or director) may define a location in a virtual scene as a mark to indicate where actions of a character performance are to take place. Similarly, the user may select a particular time represented in a timeline as being a mark that indicates when actions of a character are to be performed. Operations may also include aggregating 904 data that represents the actions of the character to be performed at the defined location (e.g., mark) in the virtual scene or timeline. For example, actions may define poses, movements, spoken dialogue or other activities associated with a character. Along with representing the actions, the aggregated data may also include other information such as editable parameters associated with one or more actions. For example, numerical values, which may be changed by a user, may define the speed and direction of a running action or may define the height of a jumping action. Operations may also include presenting 906 an editable user interface (e.g., on a display) that allows the aggregated actions to be reviewed and adjusted. For example, after being reviewed a user may change the actions (e.g., remove an action, add one or more actions, etc.) or parameters associated with one or more actions (e.g., increase the speed of a running character).

Figure 10:
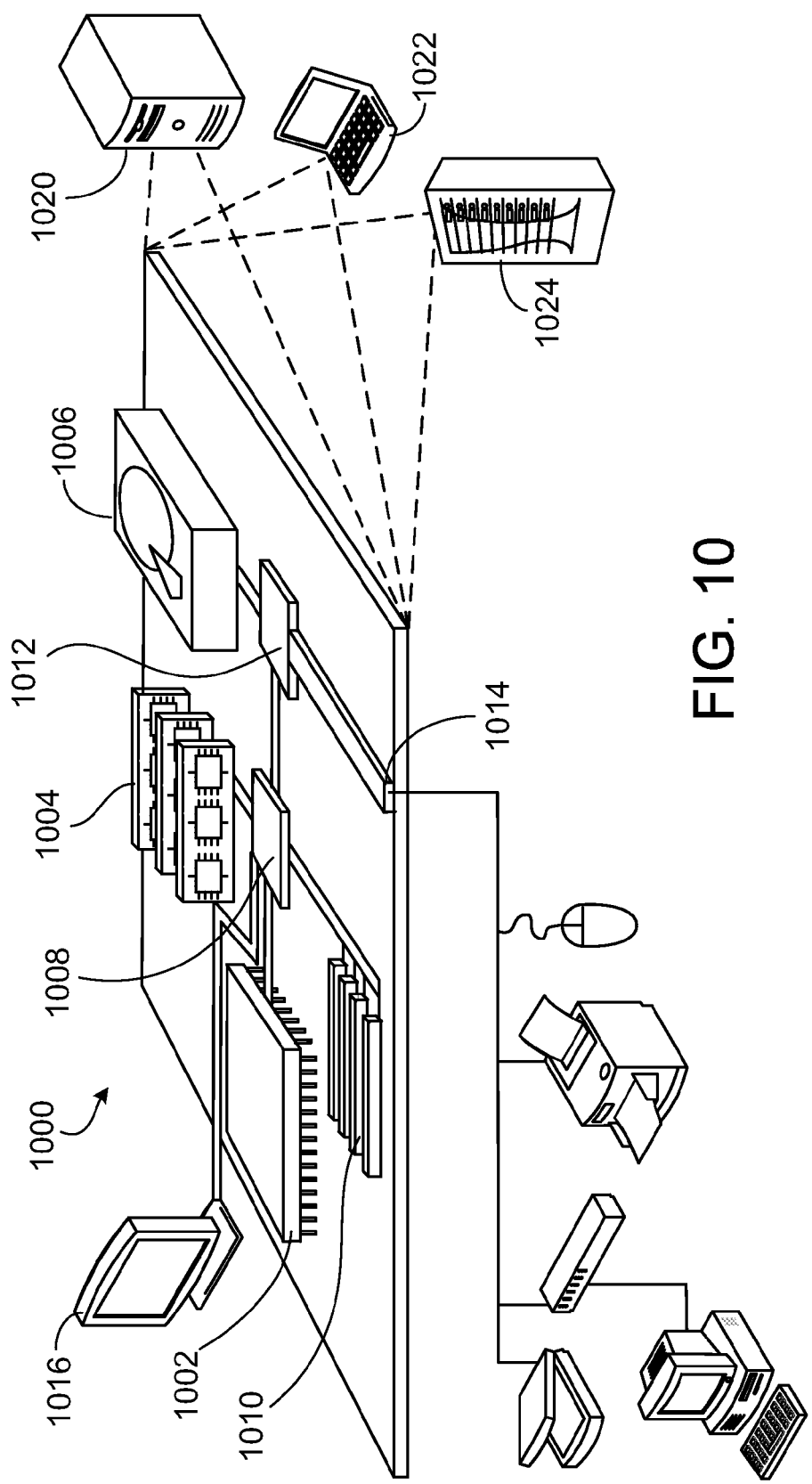
FIG. 10 is a block diagram of computing devices and systems.

FIG. 10 is a block diagram of computing devices that may be used and implemented to perform operations associated with producing and presenting editable user interfaces that list actions of a character. As such, the computing devices may provide operations similar to computer systems, servers, etc. Computing device 1000 can also represent various forms of digital computers, such as laptops, desktops, workstations, personal digital assistants, servers, blade servers, mainframes, and other appropriate computers.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses can be used, as appropriate, along with multiple memories and types of memory. Also, multiple computing devices 1000 can be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, memory on processor 1002, or the like.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which can accept various expansion cards (not shown). In the implementation, low-speed controller 1012 is coupled to storage device 1006 and low-speed expansion port 1014. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. It can also be implemented as part of a rack server system 1024. In addition, it can be implemented in a personal computer such as a laptop computer 1022. Alternatively, components from computing device 1000 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   accessing an animation comprising at least one virtual scene, wherein the virtual scene comprises at least one animated character;
   presenting the at least one virtual scene of the animation within a graphical user interface (GUI) on a display device, wherein the virtual scene is presented within a display area within the GUI;
   displaying within the display area a graphical line that identifies a direction that the animation character moves within the virtual scene;
   presenting a timeline of the animation within the GUI in an area separate from the display area;
   receiving a designation of either of a first particular location of the animated character along the graphical line in the display area or a first particular time along the timeline of the animation;
   aggregating data that represents actions of the animation character that can be performed by the animation character at the first particular location or the first particular time; and
   presenting a user interface within the GUI that includes a representation of the aggregated actions, wherein the representation is editable through the presented user interface to adjust at least one action included in the aggregation, and wherein the presented user interface:
      comprises a position indicator indicating the first particular location along the graphical line in the virtual scene or the first particular time along the timeline of the animation; and
      can be relocated within the GUI to either a second particular location or a second particular time so that at least one of the aggregated actions can be performed by the animation character in the animation at the second particular location or the second particular time.

2. The computer-implemented method of claim 1 further comprising:
   receiving designations of multiple particular times along the timeline of the animation and/or particular locations in the virtual scene,
   for each of the multiple designated particular times and/or particular locations aggregating data that represents respective actions of the animation character that can be performed by the animation character at the particular time and/or particular location; and
   presenting within the GUI respective user interfaces for each of the multiple designated particular times and/or particular locations that includes a representation of the respective aggregated actions.

3. The computer-implemented method of claim 2, wherein one or more of the actions included in the aggregated actions represented in the presented user interface corresponding to one of the multiple designated particular times and/or particular locations is relocatable to be included in the aggregated actions of another of the multiple designated particular locations in the virtual scene and/or particular times represented in the timeline.

4. The computer-implemented method of claim 1, wherein the designated first particular location is graphically represented in the virtual scene.

5. The computer-implemented method of claim 4, wherein the graphical representation in the virtual scene represents multiple designated particular locations based upon a viewing scale of the virtual scene.

6. The computer-implemented method of claim 1, wherein the designated first particular time is graphically represented on the timeline.

7. The computer-implemented method of claim 6, wherein the graphical representation on the timeline represents multiple designated particular times based upon a viewing scale of the timeline.

8. The computer-implemented method of claim 1, wherein the presented user interface is relocated to a viewable location in the virtual scene if the designated first particular location is outside the presented virtual scene.

9. The computer-implemented method of claim 1, wherein the presented user interface is relocated to a viewable portion of the timeline if the designated first particular time is outside the presented timeline.

10. A system comprising:
    a computing device comprising:
       a memory configured to store instructions; and
       a processor configured to execute the instructions to perform a method comprising:
          accessing an animation comprising at least one virtual scene, wherein the virtual scene comprises at least one animated character;
          presenting the at least one virtual scene of the animation within a graphical user interface (GUI) on a display device, wherein the virtual scene is presented within a display area within the GUI;
          displaying within the display area a graphical line that identifies a direction that the animation character moves within the virtual scene;
          presenting a timeline of the animation within the GUI in an area separate from the display area;
          receiving a designation of either of a first particular location of the animated character along the graphical line in the display area or a first particular time along the timeline of the animation;
          aggregating data that represents actions of the animation character that can be performed by the animation character at either the first particular location or the first particular time; and presenting a user interface within the GUI that includes a representation of the aggregated actions, wherein the representation is editable through the presented user interface to adjust at least one action included in the aggregation, and wherein the presented user interface:

comprises a position indicator indicating the first particular location in the virtual scene or the first particular time along the timeline of the animation; and can be relocated within the GUI to either a second particular location or a second particular time so that at least one of the aggregated actions can be performed by the animation character in the animation at the second particular location or the second particular time.

11. The system of claim 10 further comprising:

receiving designations of multiple particular times along the timeline of the animation and/or particular locations in the virtual scene;

for each of the multiple designated particular times and/or particular locations aggregating data that represents respective actions of the animation character that can be performed by the animation character at the particular time and/or particular location; and presenting within the GUI respective user interfaces for each of the multiple designated particular times and/or particular locations that includes a representation of the respective aggregated actions.

12. The system of claim 11, wherein one or more of the actions included in the aggregated actions represented in the presented user interface corresponding to one of the multiple designated particular times and/or particular locations is relocatable to be included in the aggregated actions of another of the multiple designated particular locations in the virtual scene and/or particular times represented in the timeline.

13. The system of claim 10, wherein the designated first particular location is graphically represented in the virtual scene.

14. The system of claim 13, wherein the graphical representation in the virtual scene represents multiple designated particular locations based upon a viewing scale of the virtual scene.

15. The system of claim 10, wherein the designated first particular time is graphically represented on the timeline.

16. The system of claim 15, wherein the graphical representation on the timeline represents multiple designated particular times based upon a viewing scale of the timeline.

17. The system of claim 10, wherein the presented user interface is relocated to a viewable location in the virtual scene if the designated first particular location is outside the presented virtual scene.

18. The system of claim 10, wherein the presented user interface is relocated to a viewable portion of the timeline if the designated first particular time is outside the presented timeline.

19. A computer program product tangibly embodied in a non-transitory computer readable medium and comprising instructions that when executed by a processor perform a method comprising:

accessing an animation comprising at least one virtual scene, wherein the virtual scene comprises at least one animated character;

presenting the at least one virtual scene of the animation within a graphical user interface (GUI) on a display device, wherein the virtual scene is presented within a display area within the GUI;

displaying within the display area a graphical line that identifies a direction that the animation character moves within the virtual scene;

presenting a timeline of the animation within the GUI in an area separate from the display area;

receiving a designation of either of a first particular location of the animated character along the graphical line in the display area or a first particular time represented in a timeline of the animation;

aggregating data that represents actions of the animation character that can be performed by the animation character at the first particular location or the first particular time; and presenting a user interface within the GUI that includes a representation of the aggregated actions, wherein the representation is editable through the presented user interface to adjust at least one action included in the aggregation, and wherein the presented user interface:

comprises a position indicator indicating the first particular location along the graphical line in the virtual scene or the first particular time along the timeline of the animation; and can be relocated within the GUI to either a second particular location or a second particular time so that at least one of the aggregated actions can be performed by the animation character in the animation at the second particular location or the second particular time.

20. The computer program product of claim 19 further comprising:

receiving designations of multiple particular times along the timeline of the animation and/or particular locations in the virtual scene;

for each of the multiple designated particular times and/or particular locations aggregating data that represents respective actions of the animation character that can be performed by the animation character at the particular time and/or particular location; and presenting within the GUI respective user interfaces for each of the multiple designated particular times and/or particular locations that includes a representation of the respective aggregated actions.

21. The computer program product of claim 20, wherein one or more of the actions included in the aggregated actions represented in the presented user interface corresponding to one of the multiple designated particular times and/or particular locations is relocatable to be included in the aggregated actions another of the multiple designated particular locations in the virtual scene and/or particular times represented in the timeline.

22. The computer program product of claim 19, wherein the designated particular location is graphically represented in the virtual scene.

23. The computer program product of claim 22, wherein the graphical representation in the virtual scene represents multiple designated particular locations based upon a viewing scale of the virtual scene.

24. The computer program product of claim 19, wherein the designated particular time is graphically represented on the timeline.

25. The computer program product of claim 24, wherein the graphical representation on the timeline represents multiple designated particular times based upon a viewing scale of the timeline.

26. The computer program product of claim 19, wherein the presented user interface is relocated to a viewable location in the virtual scene if the designated first particular location is outside the presented virtual scene.

27. The computer program product of claim 19, wherein the presented user interface is relocated to a viewable portion of the timeline if the designated first particular time is outside the presented timeline.

* * * * *